(12) United States Patent
Mun

(10) Patent No.: US 11,089,283 B2
(45) Date of Patent: Aug. 10, 2021

(54) GENERATING TIME SLICE VIDEO

(71) Applicant: KT Corporation, Seongnam-si (KR)

(72) Inventor: Jun Hee Mun, Yongin-si (KR)

(73) Assignee: KT Corporation, Seongnam-si (KR)

( * ) Notice: Subject to any disclaimer, the term of this patent is extended or adjusted under 35 U.S.C. 154(b) by 0 days.

(21) Appl. No.: 16/205,380

(22) Filed: Nov. 30, 2018

(65) Prior Publication Data
US 2019/0174114 A1 Jun. 6, 2019

(30) Foreign Application Priority Data

Dec. 4, 2017 (KR) .......................... 10-2017-0165389

(51) Int. Cl.
H04N 13/117 (2018.01)
H04N 13/172 (2018.01)
H04N 13/194 (2018.01)
H04N 13/167 (2018.01)
H04N 21/81 (2011.01)
H04N 5/247 (2006.01)
H04N 21/472 (2011.01)
H04N 21/218 (2011.01)

(52) U.S. Cl.
CPC .......... *H04N 13/172* (2018.05); *H04N 5/247* (2013.01); *H04N 13/117* (2018.05); *H04N 13/167* (2018.05); *H04N 13/194* (2018.05); *H04N 21/21805* (2013.01); *H04N 21/47202* (2013.01); *H04N 21/816* (2013.01)

(58) Field of Classification Search
None
See application file for complete search history.

(56) References Cited

U.S. PATENT DOCUMENTS

| 7,665,113 B1* | 2/2010 | Abrams | H04N 21/23406 725/114 |
| 8,976,871 B2* | 3/2015 | Chen | H04N 21/234327 375/240.26 |
| 9,185,346 B2* | 11/2015 | Grondal | H04L 65/1083 |
| 9,667,908 B2* | 5/2017 | Cho | H04N 9/8042 |
| 2007/0103558 A1* | 5/2007 | Cai | H04N 5/20 348/211.11 |

(Continued)

FOREIGN PATENT DOCUMENTS

| KR | 1020070000994 A | 1/2007 |
| KR | 1020170020391 A | 2/2017 |

(Continued)

*Primary Examiner* — Shadan E Haghani
(74) *Attorney, Agent, or Firm* — Hamre, Schumann, Mueller & Larson, P.C.

(57) ABSTRACT

A time slice video generating server includes a video receiving unit configured to receive multiple videos recorded by multiple cameras; a packaging unit configured to generate multiple packaging data by adding slice information to frames included in the received multiple videos; a video transmission unit configured to transmit at least one datum from the multiple packaging data to a user device in response to a play request received from the user device; and a time slice video providing unit configured to generate a time slice video based on the multiple packaging data in response to request to generate a time slice video received from the user device and transmit the generated time slice video to the user device.

16 Claims, 9 Drawing Sheets

(56) References Cited

U.S. PATENT DOCUMENTS

2013/0287093 A1* 10/2013 Hannuksela ......... H04N 19/597
                                                      375/240.02
2016/0309186 A1* 10/2016 Chen .................... H04N 19/597

FOREIGN PATENT DOCUMENTS

| KR | 1020170036476 A | 4/2017 |
| KR | 1020170051913 A | 5/2017 |

* cited by examiner

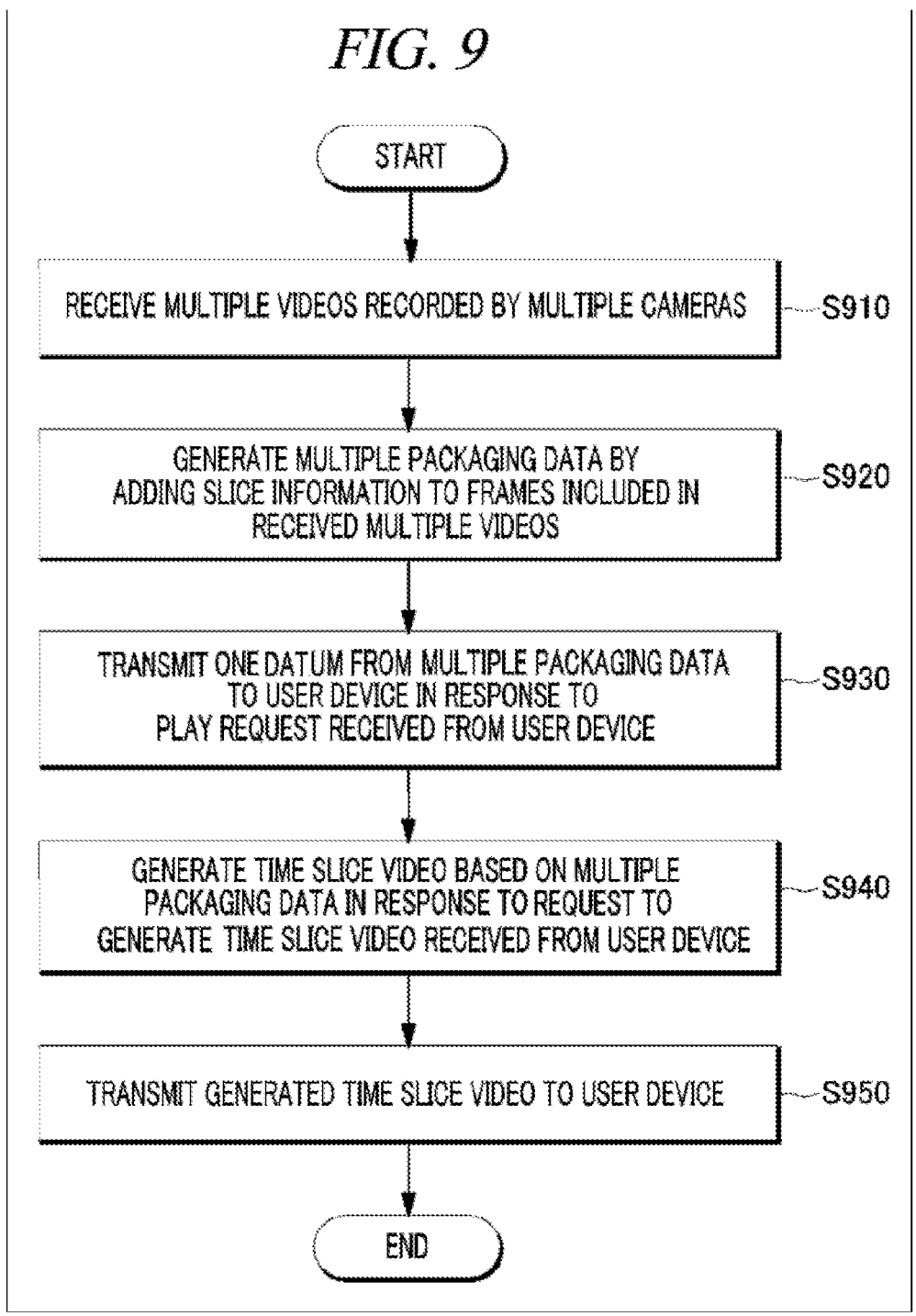

GENERATING TIME SLICE VIDEO

CROSS-REFERENCE TO RELATED APPLICATION

This application claims the benefit under 35 USC 119(a) of Korean Patent Application No. 10-2017-0165389 filed on Dec. 4, 2017, in the Korean Intellectual Property Office, the entire disclosures of which are incorporated herein by reference for all purposes.

TECHNICAL FIELD

The present disclosure relates to technologies for generating a time slice video, and a user device therefore.

BACKGROUND

Time slice techniques refer to imaging technologies by which multiple cameras face a subject from various angles and simultaneously take photos of the subject, and the photos are digitally connected, thereby making a standstill image of the subject appear as if it was captured with a movie camera. A time slice shows the subject in 3D while also providing an appearance that transcends time and space.

As for a conventional time slice video, videos for all viewpoints are held in a user device. Therefore, when a viewpoint of a time slice video is shifted, a time slice video for a corresponding viewpoint can be generated at a high speed. However, this requires too many network bands and a high network speed, which requires high performance of the user device.

FIG. 6A illustrates a conventional process of converting multiple videos into a data stream to generate a time slice video. Referring to FIG. 6A, conventionally, a time slice video service including simultaneously encoding multiple videos with multiple encoders, converting and integrating the encoded multiple videos into a stream or file with a demuxer 610, and transmitting the file to a user device through a streamer 620 has been provided in order to generate a time slice video for multiple videos. According to the conventional process, a high speed can be ensured and videos for all viewpoints are held in the user device 120 when a time slice video is generated. Therefore, a time slice video can be generated anytime depending on the user's choice and no network cooperation for time slice video is needed, and, thus, a high generation speed can be ensured. However, this requires too many network bands and a high speed of at least 0.5 GBps, which requires high performance of the user device 120.

SUMMARY

At least some of the embodiments described herein pertain to a server and method for generating a time slice video which enables a time slice video requiring high bandwidth network to be implemented even in a low bandwidth network using a virtual streamer. A corresponding user device is described, as well. Further, at least some of the embodiments described herein include a server and method for generating a time slice video which can minimize a network bandwidth required to implement a time slice video since a server group manages video information of multiple videos for respective viewpoints and transfers only package data requested by a user device group. A corresponding user device is described, as well.

At least some of the embodiments described herein pertain to a time slice video generating server that includes: a video receiving unit that receives multiple videos recorded by multiple cameras; a packaging unit configured that generates packaging data by adding slice information to frames included in the received videos; a video transmission unit that transmits at least some of the packaging data to a user device in response to a request, received from the user device, to play a time slice video; and a time slice video providing unit that generates a time slice video based on the multiple packaging data in response to a request to generate a time slice video that is received from the user device and transmits the generated time slice video to the user device.

At least one of the embodiments described herein pertains to a user device that generates a time slice video that includes: a play request unit configured to transmit, to a time slice video generating server, a request to play any one of multiple videos recorded by multiple cameras; a video receiving unit configured to receive, from the time slice video generating server, packaging data of any one of the multiple videos in response to the play request; a video play unit configured to play the video corresponding to the play request using the received packaging data; a time slice video play unit configured to transmit, to the time slice video generating server, a request to generate a time slice video; receive, from the time slice video generating server, a time slice video generated based on multiple packaging data of the multiple videos in response to the generate request; and play the received time slice video, wherein the multiple packaging data are generated by adding, by the time slice video generating server, slice information of frames included in the multiple videos.

At least one of the embodiments described herein pertains to a method for generating a time slice video to be performed by a time slice video generating server that includes: receiving multiple videos recorded by multiple cameras; generating multiple packaging data by adding slice information to frames included in of the received multiple videos; transmitting one of the multiple packaging data to a user device in response to a play request received from the user device; generating a time slice video based on the multiple packaging data in response to a time slice video generate request received from the user device; and transmitting the generated time slice video to the user device.

The embodiments referenced above and described hereafter are provided by way of illustration only and should not be construed as liming the present disclosure. Besides the above-described exemplary embodiments, there may be additional exemplary embodiments described in the accompanying drawings and the detailed description.

According to any one of the embodiments described or even suggested herein, a server and method may be implemented even in a low bandwidth network using a virtual streamer. The embodiments described or even suggested herein also include server and method for generating a time slice video which can minimize a network bandwidth needed to implement a time slice video since a server group manages video information of multiple videos for respective viewpoints and transfers only package data requested by a user device group.

BRIEF DESCRIPTION OF THE DRAWINGS

In the detailed description that follows, embodiments are described as illustrations only since various changes and modifications will become apparent to those skilled in the art from the following detailed description. The use of the same reference numbers in different figures indicates similar or identical items.

FIG. 9 is a flowchart illustrating an example processing flow for generating a time slice video, by a time slice video generating server in accordance with various embodiments described herein.

DETAILED DESCRIPTION

Figure 1:
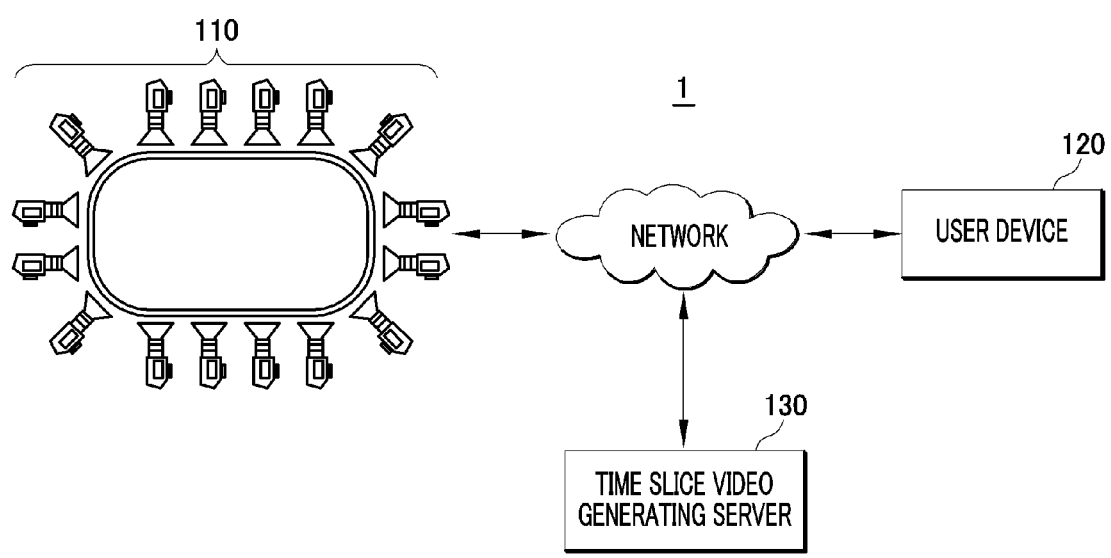
FIG. 1 is an illustration of an example of a time slice video generating system, in accordance with various embodiments described herein.

Hereafter, example embodiments of the present disclosure will be described in detail with reference to the accompanying drawings so that the present disclosure may be readily implemented by those skilled in the art. However, it is to be noted that the present disclosure is not limited to the example embodiments but can be embodied in various other ways. In the drawings, parts irrelevant to the description are omitted for the simplicity of explanation, and like reference numerals denote like parts through the whole document.

Throughout this document, the term "connected to" may be used to designate a connection or coupling of one element to another element and includes both an element being "directly connected" another element and an element being "electronically connected" to another element via another element. Further, it is to be understood that the term "comprises or includes" and/or "comprising or including" used in the document means that one or more other components, steps, operation and/or the existence or addition of elements are not excluded from the described components, steps, operation and/or elements unless context dictates otherwise; and is not intended to preclude the possibility that one or more other features, numbers, steps, operations, components, parts, or combinations thereof may exist or may be added.

Throughout this document, the term "unit" includes a unit implemented by hardware and/or a unit implemented by software. As examples only, one unit may be implemented by two or more pieces of hardware or two or more units may be implemented by one piece of hardware.

Throughout this document, a part of an operation or function described as being carried out by a terminal or device may be implemented or executed by a server connected to the terminal or device. Likewise, a part of an operation or function described as being implemented or executed by a server may be so implemented or executed by a terminal or device connected to the server.

Hereafter, example embodiments will be described in detail with reference to the accompanying drawings.

FIG. 1 is an illustration of an example of a time slice video generating system, according to at least one embodiment described herein. A time slice video generating system 1 may include multiple cameras 110, a user device 120, and a time slice video generating server 130, all of which are presently illustrated as exemplary components which may be controlled by the time slice video generating system 1.

The components of the time slice video generating system 1 illustrated in FIG. 1 are typically connected through a network. For example, as illustrated in FIG. 1, the time slice video generating server 130 may be connected to any one or more of the multiple cameras 110 and the user device 120.

The network refers to a connection structure that enables the exchange of information between nodes including one or more of multiple cameras 110, user device 120, and time slice video generating server 130. Examples of the network may include 3G, 4G, 5G, LTE (Long Term Evolution), WIMAX (World Interoperability for Microwave Access), Wi-Fi, Bluetooth, Internet, LAN (Local Area Network), Wireless LAN (Wireless Local Area Network), WAN (Wide Area Network), WWW (World Wide Web), PAN (Personal Area Network), VLC (Visible Light Communication), LiFi, and the like, but are not limited thereto.

Each of multiple cameras 110 may be utilized to capture in real-time, i.e., broadcast, and/or record at least portions of a sporting event or a live-action performance of other genres in an arena, stadium, theater, etc; and to transmit the captured or recorded video to the time slice video generating server 130. In an example configuration, multiple cameras 110 may be positioned with an arena, stadium, theater, etc., with a predetermined space therebetween.

The user device 120 may transmit, to the time slice video generating server 130, a request to play any one of multiple videos recorded by the multiple cameras 110.

The user device 120 may receive, from the time slice video generating server 130, multiple packaging data for any one of the multiple videos in response to the play request; upon receipt, the user device 120 may then play the received video. Herein, the user device 120 may receive the packaging data from the time slice video generating server 130 through a virtual streamer that is allocated to the user device 120. For example, the packaging data may refer to data packaged to include specific data for respective viewpoints for multiple original videos and respective frames thereof for each original video. Accordingly, a server group may manage packaging data for multiple videos and transfer, to the user device, packaging data of a video requested by a user device from among the multiple videos, thus reducing the requirements for network bandwidth.

The user device 120 may play the requested video, upon receipt, using the received packaging data.

The user device 120 may also transmit, to the time slice video generating server 130, a request to shift a viewpoint of a video being streamed. Then, the user device 120 may receive, from the time slice video generating server 130 via the virtual streamer, packaging data of a video corresponding to the requested viewpoint shift based on viewpoint information between the adjacent videos.

The user device 120 may also transmit, to the time slice video generating server 130, a request to generate a time slice video; receive, from the time slice video generating server 130, a time slice video generated based on the packaging data of the multiple videos in response to the request; and play the received time slice video. For example, the user device 120 may receive a time slice video, from the time slice video generating server 130 via the virtual streamer, which is generated using extracted image information for a time corresponding to the request to generate the time slice video based on time information from the packaging data of the multiple videos.

The time slice video generating server 130 may receive multiple videos recorded by the multiple cameras 110.

The time slice video generating server 130 may generate multiple packaging data by adding slice information to frames included in the received multiple videos. For example, the multiple packaging data may include image information for each frame, and the slice information may further include viewpoint information and time information added for each frame.

The time slice video generating server 130 may transmit, to the user device 120, at least one datum from the multiple packaging data, in response to the received play request.

The time slice video generating server 130 may allocate at least one virtual streamer to each user device 120.

The time slice video generating server 130 may stream, to the user device 120 via the virtual streamer, one of the multiple packaging data corresponding to the play request.

If the time slice video generating server 130 receives the viewpoint shift request from the user device 120, the virtual streamer and the user device 120 may synchronize a viewpoint for a video being streamed by the virtual streamer to the user device 120 based on viewpoint information of the video corresponding to the request.

The virtual streamer may extract, from the packaging data, data to stream from a point in time corresponding to the play request and stream the extracted data to the user device 120. The slice information may further include viewpoint information between the adjacent videos and codec information. Thus, the packaging data may be played by the user device 120 based on the codec information.

The time slice video generating server 130 may generate a time slice video based on the packaging data in response to the request to generate a time slice video that is received from the user device 120 and then transmit the generated time slice video to the user device 120.

If the time slice video generating server 130 receives the viewpoint shift request from the user device 120, the time slice video generating server 130 may stream, to the user device 120 via the virtual streamer, a packaging data of a video corresponding to the viewpoint shift request based on viewpoint information between the adjacent videos. If the virtual streamer receives the generate request from the user device 120, the virtual streamer may stop streaming to the user device 120.

The time slice video generating server 130 may generate a time slice video using packaging data for multiple videos corresponding to the request to generate a time slice video received through the virtual streamer. The virtual streamer may extract, from the packaging data of the multiple videos, image information for a point in time corresponding to the request and generate a time slice video using the extracted image information.

Figure 2:
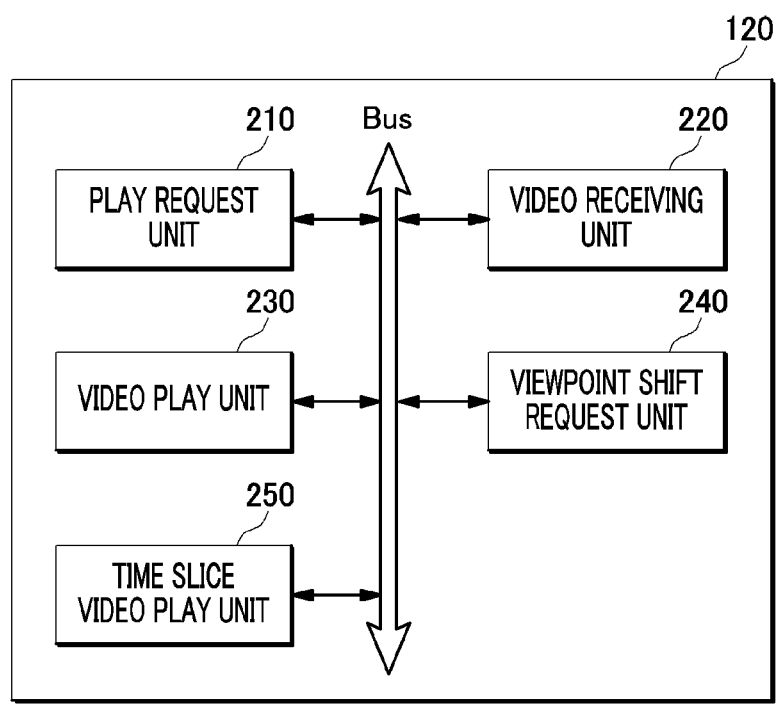
FIG. 2 is a block diagram illustrating an example of a user device, in accordance with various embodiments described herein.

FIG. 2 is a block diagram illustrating an example of a user device, in accordance with various embodiments described herein. The user device 120 may include a play request unit 210, a video receiving unit 220, a video play unit 230, a viewpoint shift request unit 240, and a time slice video play unit 250.

The play request unit 210 may be configured to transmit, to the time slice video generating server 130, a request to play any one of multiple videos recorded by the multiple cameras 110.

The video receiving unit 220 may be configured to receive, from the time slice video generating server 130, packaging data of any one of the multiple videos in response to the play request. That is, the user device does not receive a requested video among the multiple videos, but instead receives packaging data corresponding to a requested video.

For example, the video receiving unit 220 may be configured to receive the packaging data from the time slice video generating server 130, via a virtual streamer that is allocated to the user device 120. Packaging data for each video may be generated by adding slice information of a frame to each of multiple frames constituting each video; and the slice information may further include, for each frame, viewpoint information between the adjacent videos and time information.

In accordance with another example, the video receiving unit 220 may be configured to receive, from the time slice video generator 130 via the virtual streamer, packaging data for a video corresponding to a viewpoint shift request, based on the viewpoint information between the adjacent videos.

The video play unit 230 may be configured to play the requested video using the received packaging data.

The viewpoint shift request unit 240 may be configured to transmit, to the time slice video generating server 130, a request to shift a viewpoint for a video being streamed.

The time slice video play unit 250 may be configured to transmit, to the time slice video generating server 130, a request to generate a time slice video; receive, from the time slice video generating server 130, the requested time slice video generated based on the packaging data of the multiple videos; and play the received time slice video.

For example, the time slice video play unit 250 may be configured to receive, from the time slice video generating server 130 through the virtual streamer, a time slice video, which is generated using extracted image information for a time point corresponding to the generate request from the packaging data of the multiple videos based on time information.

Figure 3:
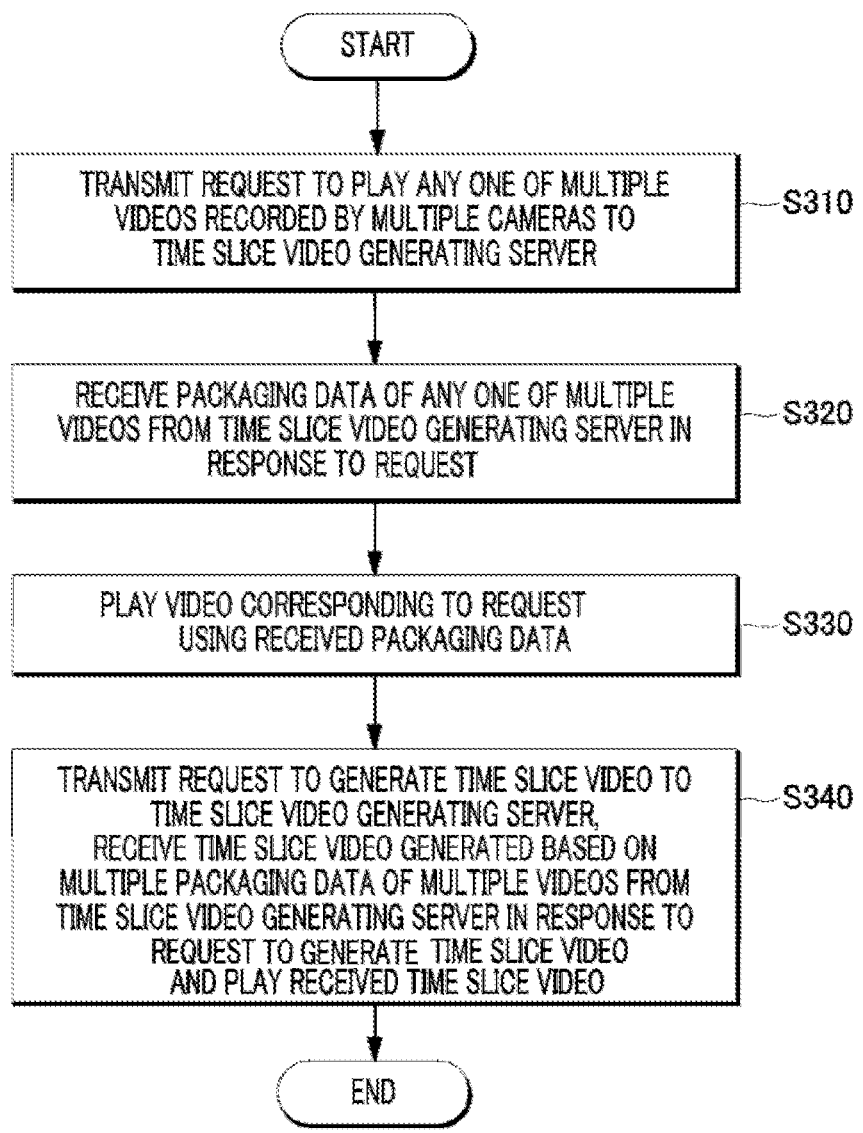
FIG. 3 is a flowchart illustrating an example processing flow for playing a time slice video by a user device, in accordance with various embodiments described herein.

FIG. 3 is a flowchart illustrating an example processing flow for playing a time slice video by a user device, in accordance with various embodiments described herein. The processing flow may be performed by some or all components of the user device 120 illustrated in FIG. 3, in accordance with system 1 as shown in, at least, the embodiments illustrated in FIG. 1 and FIG. 2.

In a process S310, the user device 120 may transmit, to the time slice video generating server 130, a request to play any one of multiple videos recorded by the multiple cameras 110. The time slice video generating server 130 may perform packaging for multiple frames constituting each of the multiple videos.

In a process S320, the user device 120 may receive, from the time slice video generating server 130, packaging data of any one of the multiple videos in response to the play request.

In a process S330, the user device 120 may play the requested video using the received packaging data.

In a process S340, the user device 120 may transmit, to the time slice video generating server 130, a request to generate a time slice video; receive, from the time slice video generating server 130, a time slice video generated based on the multiple packaging data from the multiple videos in response to the generate request; and play the received time slice video.

In the descriptions above, the processes S310 to S340 may be divided into additional processes or combined into fewer processes depending on an embodiment. In addition, some of the processes may be omitted and the sequence of the processes may be changed if necessary.

Figure 4:
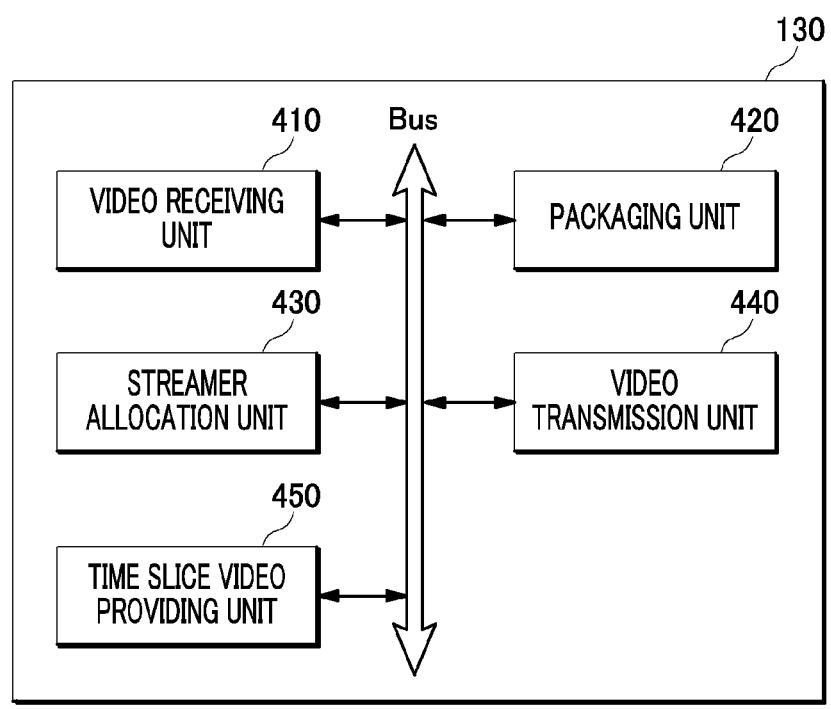
FIG. 4 is a block diagram illustrating an example of a time slice video generating server, in accordance with various embodiments described herein.

FIG. 4 is a block diagram illustrating an example of a time slice video generating server, in accordance with various embodiments described herein. As shown in the example of FIG. 4, the time slice video generating server 130 may include a video receiving unit 410, a packaging unit 420, a streamer allocation unit 430, a video transmission unit 440, and a time slice video providing unit 450.

The video receiving unit 410 may be configured to receive multiple videos recorded by the multiple cameras 110.

The packaging unit 420 may be configured to generate multiple packaging data by adding slice information to frames included in the received multiple videos, as preprocessing to be performed before transmitting a video to the user device. The multiple packaging data may further include image information for each frame, and the slice information may include viewpoint information and time information added for each frame. The slice information may further include viewpoint information between the adjacent videos and codec information. The packaging data may be played by the user device 120 based on the codec information.

The packaging data will be described in more detail with reference to FIG. 5.

Figure 5:
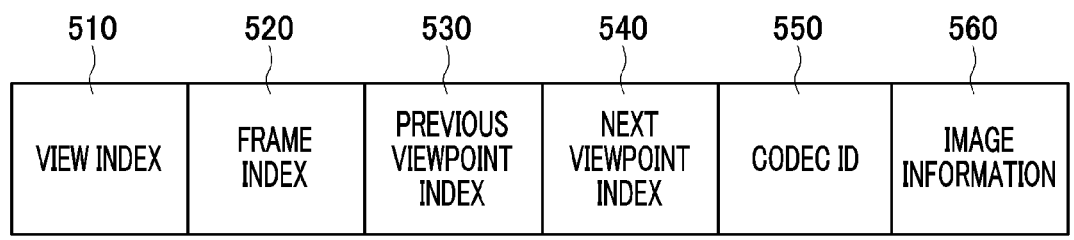
FIG. 5 is an illustration of an example of packaging data generated for respective multiple frames constituting each video, in accordance with various embodiments described herein.

FIG. 5 is an illustration of an example of packaging data generated for respective multiple frames constituting each video, in accordance with various embodiments described herein. Referring to FIG. 5, the packaging data may be generated by adding slice information of a frame to each of multiple frames constituting each of multiple videos and may include a view index 510 indicating viewpoint information of each video, a frame index 520 indicating time information of a frame, a previous viewpoint index 530, a next viewpoint index 540, slice information including a codec ID 550, and image information 560.

The view index 510 may include viewpoint information of a video which is currently streamed. For example, if viewpoint information of a video which is currently streamed is "viewpoint 2", the view index 510 may enable viewpoint information of "viewpoint 2" to be stored and play viewpoints between the user device 120 and the virtual streamer to be synchronized.

The frame index 520 may include time information of each of multiple frames constituting each video. The frame index 520 is information required for synchronizing respective videos being played and synchronizing different play viewpoints when shifting viewpoints and may be used as basic data to extract video information of a specific viewpoint from videos from different viewpoints even when a time slice video is generated.

The viewpoint information between the adjacent videos may include the previous viewpoint index 530 and the next viewpoint index 540. The previous viewpoint index 530 may include information about a previous viewpoint relative to a current play viewpoint for a video being played by the current user device or a video being transmitted to the current user device. For example, if the current play viewpoint is "viewpoint 2", the previous viewpoint index 530 may store viewpoint information of "viewpoint 1". The previous viewpoint index 530 is used for shift to a previous viewpoint at the request of the user device 120, and if there is no previous viewpoint, all bits may be filled with "1".

The next viewpoint index 540 may include information about a next viewpoint relative to a current play viewpoint for a video being played in the current user device or a video being transmitted to the current user device. For example, if the current play viewpoint is "viewpoint 2", the next viewpoint index 540 may store viewpoint information for "viewpoint 3". The next viewpoint index 540 is used for shifting to a next viewpoint when receiving a request from the user device 120, and if there is no next viewpoint, all bits may be filled with "1".

The codec ID 550 may include codec information of a compressed video. The user device 120 can restore and play video information using a corresponding codec with the codec ID 550.

The image information 560 may include images of respective frames constituting each video, and the images of respective frames are required to play each video.

Referring to FIG. 4 again, the streamer allocation unit 430 may be configured to allocate a virtual streamer to the user device 120. For example, the virtual streamer may allocate an initial viewpoint to the user device 120 and encode a video for the viewpoint in real time.

If a viewpoint shift request is received from the user device 120, the virtual streamer and the user device 120 may synchronize viewpoints of a video being streamed by the virtual streamer to the user device 120, based on viewpoint information of each video.

The virtual streamer may extract, from the packaging data, streaming data from a point in time corresponding to when the play request is received and stream the extracted streaming data to the user device 120. In other words, the virtual streamer is not configured to stream all packaging data of a specific video received from the user device but is, instead, configured to extract and provide pertinent packaging data of the video corresponding to the point in time corresponding to the play request.

If the virtual streamer receives the request to generate the time slice video from the user device 120, the virtual streamer may stop streaming to the user device 120. In this case, the virtual streamer may collect all videos corresponding to the requested view point, perform encoding, transfer streaming information to the user device 120, and then wait for a request to transmit a time slice video.

The video transmission unit 440 may be configured to transmit, to the user device 120, packaging data of any one of the multiple videos in response to the play request received from the user device 120.

The video transmission unit 440 may be configured to stream packaging data for the video corresponding to the play request to the user device 120 through the virtual streamer. For example, if the video transmission unit 440 receives a viewpoint shift request from the user device 120, the video transmission unit 440 may be configured to stream packaging data of a video corresponding to the viewpoint shift request to the user device 120 through the virtual streamer based on viewpoint information between the adjacent videos.

The virtual streamer may be initialized to transfer, to the user device 120, packaging data corresponding to a new view point in response to the viewpoint shift request received from the user device 120. If the virtual streamer responds to the viewpoint shift request without initialization, previous data caused by each codec may be present, and, thus, data for a video corresponding to a previous view point may remain. Therefore, the virtual streamer may be initialized and then may load image information of a video corresponding to a new view point in response to the viewpoint shift request and may perform encoding to generate packaging data for the new view point.

The time slice video providing unit 450 may be configured to generate a time slice video based on the packaging data in response to the time slice video generate request received from the user device 120 and transmit the generated time slice video to the user device 120. For example, the time slice video providing unit 450 may be configured to generate a time slice video using packaging data for multiple videos corresponding to the generate request received through the virtual streamer.

The virtual streamer may extract, from the packaging data of the multiple videos, image information for a point in time corresponding to the request to generate the time slice video based on time information, and generate a time slice video using the extracted image information. For example, the virtual streamer may compare the time point corresponding to the time slice video generate request with time information of frames of packaging data of each video and extract image information for the time point corresponding to the time slice video generate request from the packaging data of each video to generate a time slice video.

Figure 6A:
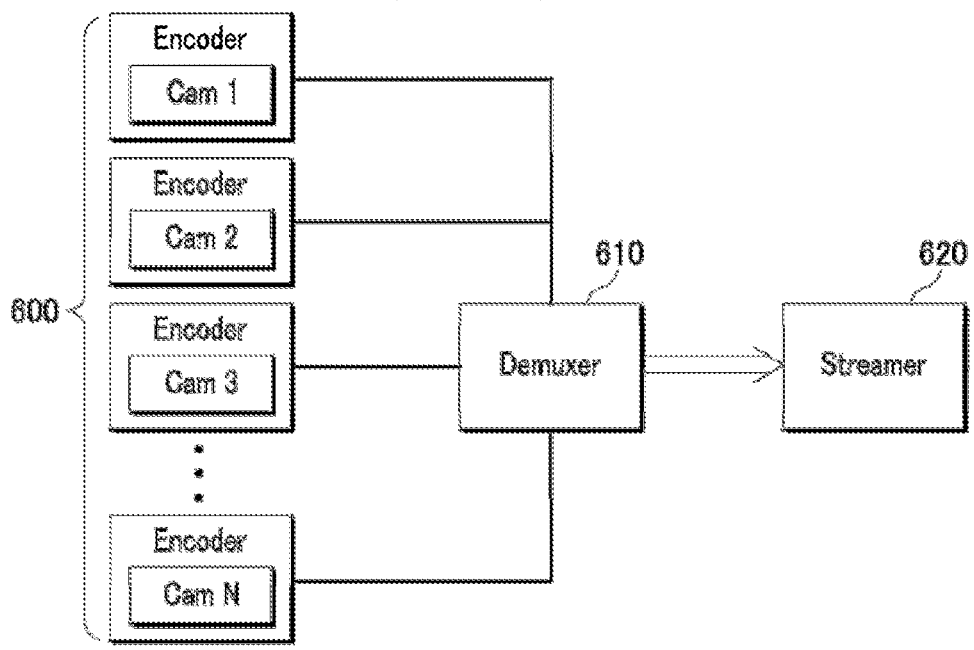
FIG. 6A illustrates a conventional process of converting multiple videos into a data stream to generate a time slice video.
Figure 6B:
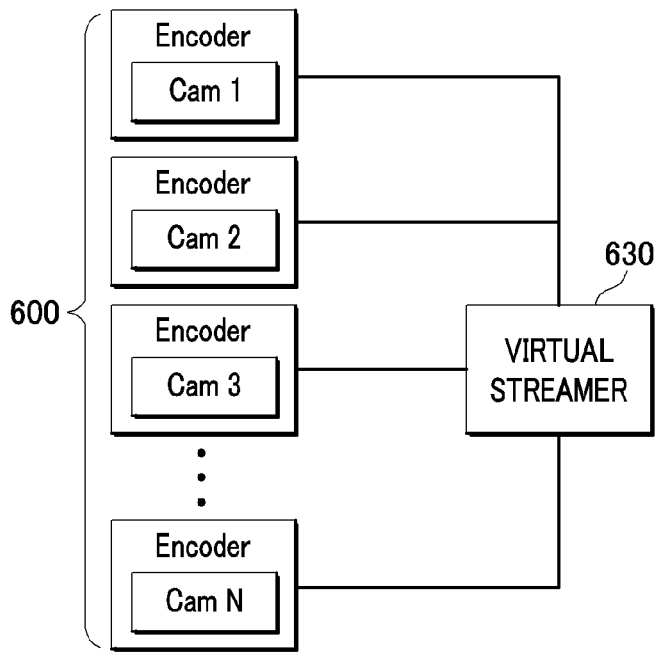
FIG. 6B are example depictions to explain a process of converting multiple videos into a stream to generate a time slice video, in accordance with various embodiments described herein.

FIG. 6B are example depictions to explain a process of converting multiple videos into a stream to generate a time slice video, in accordance with various embodiments described herein.

FIG. 6B illustrates a process of generating a time slice video for multiple videos according to at least one embodiment described herein. Referring to FIG. 6B, packaging data of a video corresponding to the user's request from among multiple videos can be provided by a virtual streamer 630, and a time slice video may be generated based on packaging data of the multiple videos.

Encoders 600 may be configured to collect videos recorded by respective cameras, store encoded information thereof (e.g., information of each frame and viewpoint information), and manage the encoded information by classifying the encoded information into packaging data for respective viewpoints and respective frames.

The virtual streamer 630 may be configured to transmit packaging data to the user device 120 using the encoded information.

Accordingly, described herein are processes by which the time slice video generating server 130 manages video information for each viewpoint and transfers only a package requested by the user of the user devices 120 to satisfy the requirements of a network bandwidth.

Figure 7:
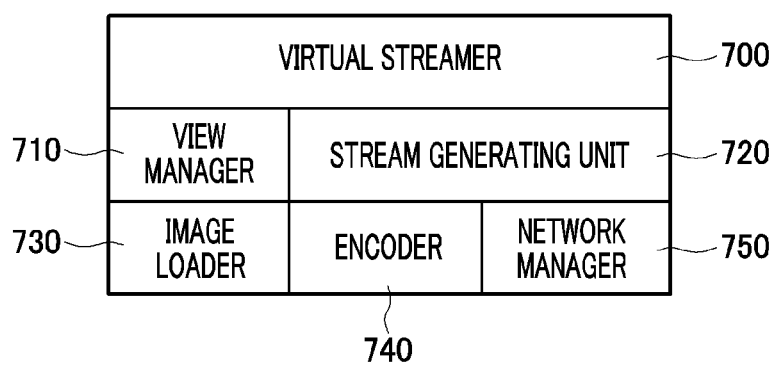
FIG. 7 is an illustration of an example of a virtual streamer, in accordance with various embodiments described herein.

FIG. 7 is an illustration of an example of a virtual streamer, in accordance with various embodiments described herein. Referring to FIG. 7, a virtual streamer 700 may include a view manager 710, a stream generating unit 720, an image loader 730, an encoder 740, and a network manager 750.

The view manager 710 may be configured to manage a viewpoint at which the user is currently watching, manage a viewpoint shift at the request of the user, and manage and store data thereof. Further, the view manager 710 may synchronize time for a previous viewpoint and a current viewpoint in response to a viewpoint shift request that is received from the user device 120. For example, if the view manager 710 receives a viewpoint shift request from the user device 120, the view manager 710 may find information about a frame based on information regarding the time the video is playing to synchronize the corresponding viewpoint and transmit to the image loader 730 and encoder 740, a request to generate a new video stream using the corresponding image information. Furthermore, when a time slice video is generated, the view manager 710 may perform enlargement for generating the time slice video depending on the placement order of viewpoints and scenario adaptation and manage and adapt scenarios for respective frames.

The stream generating unit 720 may be configured to generate a video stream and may generate stream information to be transferred to the user device 120 and transfer the generated stream information to the network manager 750 when a viewpoint is shifted or a time slice video is generated.

The image loader 730 may be configured to load a generated image from the encoder 740 and manage the loaded image in a buffer. Further, when a viewpoint is shifted, the image loader 730 may load an image for a shifted viewpoint and flush a buffer before conversion into a stream.

The encoder 740 may be configured to encode image data transferred from the image loader 730, and transfer the encoded image data to the stream generating unit 720. Further, the encoder 740 may generate new packaging data according to a viewpoint shift, and transfer the generated packaging data to the stream generating unit 720. Furthermore, when a request to generate a time slice video is received, the encoder 740 may encode images for respective view points, and transfer the encoded images to the stream generating unit 720.

The network manager 750 may be configured to make a request to generate a time slice video for the user and analyze and transfer the request. The network manager 750 may be configured to transfer data received from the stream generating unit 720 to the user through the network.

Figure 8:
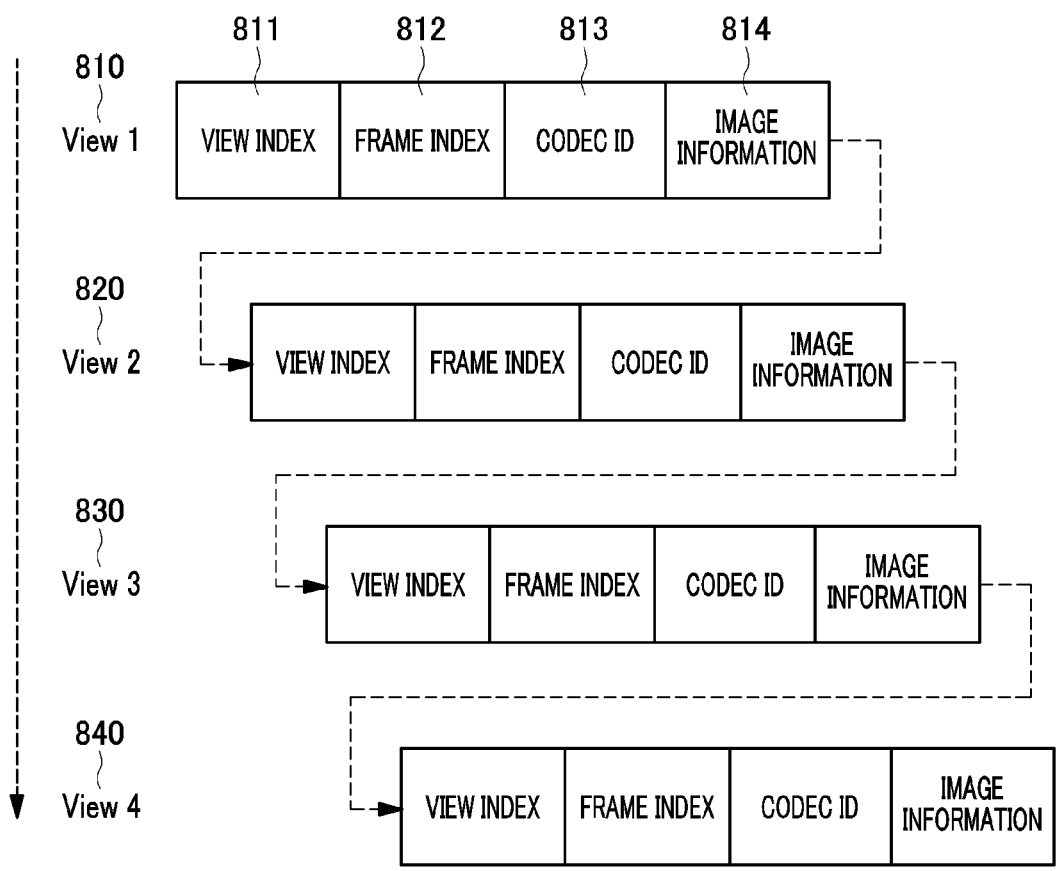
FIG. 8 includes example depictions of a sample process of generating a time slice video, in accordance with various embodiments described herein.

FIG. 8 includes example depictions of a sample process of generating a time slice video, in accordance with various embodiments described herein. In order to generate packaging data of a time slice video, image information for respective viewpoints may be loaded based on time information of the same frame among video information for all viewpoints. In general, a video is generated by time-sequentially encoding images for a single viewpoint, whereas a time slice video is generated by extracting frames for the same time from respective viewpoints and encoding the frames sequentially in terms of viewpoint. If an existing video being watched needs to be newly encoded into a time slice video, an encoder buffer is emptied to perform initialization. For the user device 120 to decode videos using encoded data of the respective videos, packaging data including slice information of multiple frames each including a view index 811, a frame index 812, and a codec ID 813 and image information 814 are utilized. The packaging data may be stored for each viewpoint, and transferred to the user device 120.

For example, it may be assumed that packaging data of videos for respective viewpoints (a first viewpoint 810, a second viewpoint 820, a third viewpoint 840, and a fourth viewpoint 850) are generated and a request to generate a time slice video is received while a video for the first viewpoint 810 is played in the user device 120. The time slice video generating server 130 may check and use the frame index 812 for the first viewpoint 810 corresponding to a time point at which the request to generate a time slice video is received and frame indexes for the other viewpoints (the second viewpoint 820, the third viewpoint 840, and the fourth viewpoint 850) synchronized in time with the frame index 812 for the first viewpoint 810. Then, the time slice video generating server 130 may extract video data from the packaging data of the respective videos and generate a time slice video by using the first viewpoint 810 and the other viewpoints (the second viewpoint 820, the third viewpoint 840, and the fourth viewpoint 850).

FIG. 9 is a flowchart illustrating an example processing flow for generating a time slice video by a time slice video generating server, in accordance with various embodiments described herein. The processing flow may be performed by the time slice video generating server 130 according to the embodiment illustrated in FIG. 9, and may be applied to the method for generating a time slice video which is performed by the time slice video generating server 130 according to the embodiments illustrated in FIG. 1 through FIG. 8.

In a process S910, the time slice video generating server 130 may receive multiple videos recorded by the multiple cameras 110.

In a process S920, the time slice video generating server 130 may generate multiple packaging data by adding slice information to frames included in the received multiple videos. For example, the multiple packaging data may further include image information of each frame, and the slice information may further include viewpoint information and time information added for each frame.

In a process S930, the time slice video generating server 130 may transmit, to the user device 120, one of the multiple packaging data in response to a play request received from the user device 120.

In a process S940, the time slice video generating server 130 may generate a time slice video based on the multiple packaging data in response to a request to generate a time slice video received from the user device 120.

In a process S950, the time slice video generating server 130 may transmit the generated time slice video to the user device 120.

Although not illustrated in FIG. 9, the time slice video generating server 130 may further perform allocating a virtual streamer to the user device 120 and streaming the packaging data of the video corresponding to the play request to the user device 120 through the virtual streamer.

Although not illustrated in FIG. 9, the time slice video generating server 130 may further perform generating a time slice video using the packaging data of the multiple videos corresponding to the generate request through the virtual streamer.

In the descriptions above, the processes S910 to S950 may be divided into additional processes or combined into fewer processes depending on an embodiment. In addition, some of the processes may be omitted and the sequence of the processes may be changed if necessary.

The method for generating time slice video and providing time slice video by the time slice video generating server and the user device described above with reference to FIG. 1 to FIG. 9 can be implemented in a computer program stored in a medium to be executed by a computer or a storage medium including instructions codes executable by a computer. Also, the method for generating time slice video and providing time slice video by the time slice video generating server and the user device described above with reference to FIG. 1 to FIG. 9 can be implemented in a computer program stored in a medium to be executed by a computer.

A computer-readable medium can be any usable medium which can be accessed by the computer and includes all volatile/non-volatile and removable/non-removable media. Further, the computer-readable medium may include all computer storage and communication media. The computer storage medium includes all volatile/non-volatile and removable/non-removable media embodied by a certain method or technology for storing information such as computer-readable instruction code, a data structure, a program module or other data. The communication medium typically includes the computer-readable instruction code, the data structure, the program module, or other data of a modulated data signal such as a carrier wave, or other transmission mechanism, and includes a certain information transmission medium.

The above description of the present disclosure is provided for the purpose of illustration, and it would be understood by those skilled in the art that various changes and modifications may be made without changing technical conception and essential features of the present disclosure. Thus, it is clear that the above-described embodiments are illustrative in all aspects and do not limit the present disclosure. For example, each component described to be of a single type can be implemented in a distributed manner. Likewise, components described to be distributed can be implemented in a combined manner.

The scope of the present disclosure is defined by the following claims rather than by the detailed description of the embodiment. It shall be understood that all modifications and embodiments conceived from the meaning and scope of the claims and their equivalents are included in the scope of the present disclosure.

I claim:

1. A time slice video generating server, comprising:
   a video receiving unit configured to receive multiple videos recorded by multiple cameras;
   a packaging unit configured to generate multiple packaging data by adding slice information to frames included in the received multiple videos, the slice information including a previous viewpoint index and a next viewpoint index relative to a current play viewpoint for a video being played by a user device;
   a video transmission unit configured to transmit at least one datum from the multiple packaging data to the user device in response to a play request received from the user device;
   a time slice video providing unit configured to:
      generate a time slice video based on the multiple packaging data in response to a request to generate a time slice video received from the user device, and
      transmit the generated time slice video to the user device;
   the packaging unit is further configured to generate, in response to a viewpoint shift request from the user device, the packaging data for a new viewpoint corresponding to the viewpoint shift request based on a previous viewpoint index or a next viewpoint index included in the transmitted datum, the generated packaging data for the new viewpoint including a new previous viewpoint index and a new next viewpoint index relative to the new viewpoint; and
   the video transmission unit is further configured to stream the generated packaging data for the new viewpoint to the user device.

2. The time slice video generating server of claim 1, wherein the multiple packaging data further include image information for each frame, and the slice information includes viewpoint information and time information added for each frame.

3. The time slice video generating server of claim 2, further comprising:
   a streamer allocation unit configured to allocate a virtual streamer to the user device, wherein the video transmission unit is configured to transmit the at least one datum of the multiple packaging data corresponding to the play request to the user device through the virtual streamer.

4. The time slice video generating server of claim 3, wherein the virtual streamer and the user device synchronize viewpoints of a video being streamed through the virtual streamer to the user device based on viewpoint information of a video corresponding to the viewpoint shift request.

5. The time slice video generating server of claim 4, wherein if the virtual streamer receives the time slice video generate request from the user device, the virtual streamer stops streaming to the user device.

6. The time slice video generating server of claim 5, wherein the time slice video providing unit is configured to generate the time slice video using the multiple packaging data of the multiple videos corresponding to the request to generate the time slice video through the virtual streamer.

7. The time slice video generating server of claim 6, wherein the virtual streamer is further configured to:
 extract image information for a time point corresponding to the request to generate the time slice video from the multiple packaging data of the multiple videos based on the time information, and
 generate the requested time slice video using the extracted image information.

8. The time slice video generating server of claim 3, wherein the allocated virtual streamer extracts stream data from a time point corresponding to the play request from the at least one datum of the packaging data and streams the extracted stream data to the user device.

9. The time slice video generating server of claim 1,
 wherein the slice information further includes codec information, and
 the packaging data are played by the user device based on the codec information.

10. A user device that generates a time slice video, comprising:
 a play request unit configured to transmit, to a time slice video generating server, a request to play any one of multiple videos recorded by multiple cameras;
 a video receiving unit configured to receive, from the time slice video generating server, packaging data of any one of the multiple videos in response to the request;
 a video play unit configured to play the video corresponding to the request using the received packaging data;
 a time slice video play unit configured to:
  transmit a request to generate a time slice video to the time slice video generating server,
  receive, from the time slice video generating server, a time slice video generated based on multiple packaging data of the multiple videos in response to the request to generate the time slice video, and
  play the received time slice video,
 wherein the multiple packaging data are generated by adding slice information of frames included in the multiple videos by the time slice video generating server, the slice information including a previous viewpoint index and a next viewpoint index relative to a current play viewpoint for the video being played by the user device, and
 a viewpoint shift request unit configured to transmit a viewpoint shift request to shift a viewpoint for a video being streamed to the time slice video generating server, and
  wherein the packaging data for a new viewpoint corresponding to the viewpoint shift request is generated based on a previous viewpoint index or a next viewpoint index included in the received packaging data, the generated packaging data for the new viewpoint including a new previous viewpoint index and a new next viewpoint index relative to the new viewpoint,
 the video receiving unit receives the generated packaging data for the new viewpoint from the time slice video generating server.

11. The user device of claim 10, wherein the video receiving unit is configured to receive the packaging data from the time slice video generating server through a virtual streamer allocated to the user device.

12. The user device of claim 11,
 wherein the slice information includes time information added for each frame, and
 the time slice video play unit receives a time slice video generated using image information for a time point corresponding to the generate request which is extracted based on the time information from the packaging data of the multiple vides from the time slice video generating server through the virtual streamer.

13. A method for generating a time slice video to be performed by a time slice video generating server, comprising:
 receiving multiple videos recorded by multiple cameras;
 generating multiple packaging data by adding slice information to frames included in the received multiple videos, the slice information including a previous viewpoint index and a next viewpoint index relative to a current play viewpoint for a video being played by a user device;
 transmitting at least one datum from the multiple packaging data to the user device in response to a play request received from the user device;
 generating a time slice video based on the multiple packaging data in response to a request to generate a time slice video received from the user device; and
 transmitting the generated time slice video to the user device,
 generating the packaging data for a new viewpoint corresponding to the viewpoint shift request, in response to a viewpoint shift request from the user device, based on a previous viewpoint index or a next viewpoint index included in the transmitted datum, the generated packaging data for the new viewpoint including a new previous viewpoint index and a new next viewpoint index relative to the new viewpoint; and
 streaming the generated packaging data for the new viewpoint to the user device.

14. The method for generating a time slice video of claim 13, wherein the multiple packaging data further include image information for each frame, and the slice information includes viewpoint information and time information added for each frame.

15. The method for generating a time slice video of claim 14, further comprising:
 allocating a virtual streamer to the user device; and
 streaming the at least one datum of the multiple packaging data corresponding to the play request to the user device through the virtual streamer.

16. The method for generating a time slice video of claim 15, further comprising:
 generating a time slice video using the multiple packaging data of the multiple videos corresponding to the time slice video generate request through the virtual streamer.

* * * * *